US009900098B2

(12) United States Patent
Park et al.

(10) Patent No.: US 9,900,098 B2
(45) Date of Patent: Feb. 20, 2018

(54) OPTICAL DEVICE MODULE AND OPTICAL COMMUNICATION NETWORK SYSTEM USING THE SAME

(71) Applicant: Electronics and Telecommunications Research Institute, Daejeon (KR)

(72) Inventors: Sahnggi Park, Daejeon (KR); Sang Gi Kim, Daejeon (KR); Seong Wook Yoo, Daegu (KR); Gyungock Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 297 days.

(21) Appl. No.: 14/684,195

(22) Filed: Apr. 10, 2015

(65) Prior Publication Data

US 2015/0215045 A1   Jul. 30, 2015

Related U.S. Application Data

(62) Division of application No. 13/934,006, filed on Jul. 2, 2013, now Pat. No. 9,031,365.

(30) Foreign Application Priority Data

Feb. 22, 2013 (KR) .................. 10-2013-0019230

(51) Int. Cl.
*G02B 6/34* (2006.01)
*H04B 10/27* (2013.01)
*G02B 6/12* (2006.01)
*G02B 6/293* (2006.01)
*G02B 6/42* (2006.01)

(52) U.S. Cl.
CPC ......... *H04B 10/27* (2013.01); *G02B 6/12004* (2013.01); *G02B 6/29373* (2013.01); *G02B 6/34* (2013.01); *G02B 6/4214* (2013.01); *G02B 2006/12114* (2013.01)

(58) Field of Classification Search
CPC .............................. G02B 6/34; G02B 6/3528
See application file for complete search history.

(56) References Cited

U.S. PATENT DOCUMENTS

| 4,059,338 A | 11/1977 | Hartelius, Jr. |
| 4,152,045 A | 5/1979 | Hammer |
| 4,545,642 A | 10/1985 | Auracher et al. |
| 4,653,844 A | 3/1987 | Ward |
| 4,932,743 A | 6/1990 | Isobe et al. |
| 5,420,947 A | 5/1995 | Li et al. |

(Continued)

OTHER PUBLICATIONS

Jacob S. Levy et al., "CMOS-compatible multiple-wavelength oscillator for on-chip optical interconnects", Nature Photonics, Jan. 2010, pp. 37-40, vol. 4, Macmillan Publishers Limited.

(Continued)

*Primary Examiner* — Charlie Y Peng

(57) ABSTRACT

An optical device module includes a substrate, an interlayer insulating layer on the substrate, an optical waveguide on the interlayer insulating layer, an optical device on the optical waveguide, and a prism disposed between the optical device and the optical waveguide. The prism has a refractive index greater than a refractive index of the optical waveguide.

17 Claims, 6 Drawing Sheets

(56) References Cited

U.S. PATENT DOCUMENTS

| | | | | |
|---|---|---|---|---|
| 5,521,992 | A * | 5/1996 | Chun | G02B 6/1221 |
| | | | | 257/666 |
| 6,690,845 | B1 * | 2/2004 | Yoshimura | G02B 6/12002 |
| | | | | 257/E23.01 |
| 6,864,512 | B2 | 3/2005 | Johannessen | |
| 7,376,295 | B2 * | 5/2008 | Lee | G02B 6/12002 |
| | | | | 385/14 |
| 7,428,358 | B2 | 9/2008 | Lu et al. | |
| 8,781,319 | B2 * | 7/2014 | Goldstein | G02B 6/43 |
| | | | | 385/15 |
| 2006/0008199 | A1 * | 1/2006 | Glebov | G02B 6/43 |
| | | | | 385/15 |
| 2009/0242948 | A1 * | 10/2009 | Barrett | H01L 27/14685 |
| | | | | 257/291 |
| 2012/0033978 | A1 * | 2/2012 | Morris | G06F 13/409 |
| | | | | 398/115 |

OTHER PUBLICATIONS

Tymon Barwicz et al., "Microring-resonator-based add-drop filters in SiN: fabrication and analysis", Optics Express, Apr. 5, 2004, pp. 1437-1442, vol. 12, No. 7, OSA.

Sahnggi Park et al., "Si micro-ring MUX/DeMUX WDM filters", Optics Express, Jul. 4, 2011, pp. 13531-13539, vol. 19, No. 14, OSA.

* cited by examiner

OPTICAL DEVICE MODULE AND OPTICAL COMMUNICATION NETWORK SYSTEM USING THE SAME

CROSS-REFERENCE TO RELATED APPLICATIONS

The present application is a divisional of U.S. application Ser. No. 13/934,006, filed on Jul. 2, 2013, which claims priority under 35 U.S.C. § 119 to Korean Patent Application No. 10-2013-0019230, filed on Feb. 22, 2013, the entireties of which are incorporated by reference herein.

BACKGROUND

The inventive concept relates to an optical communication device and, more particularly, to an optical device module including an optical waveguide of a silicon-compound and an optical communication network system using the same.

As electronic devices become smaller and faster, researches are being conducted for increasing integration degree of elements constituting the electronic devices. Fast signal transmission between the elements is required along with small sizes of the elements for small sizes and high speed of the electronic devices.

An optical communication technique may be applied between the electronic devices for increasing a signal transmission speed between the elements. If the optical communication technique is applied into the electronic device, the signal transmission speed may increase, and various problems (e.g., high resistance, occurrence of high heat, and/or parasitic capacitance, etc.) of a conventional signal transmission method may be alleviated.

Recently, various researches are being conducted for applying an optical fiber-communication technique in the maturity stage to a computer. For example, a silicon photonics technology uses an optical waveguide of a silicon material for transmission of an optical signal. Additionally, an optical fiber may be inserted in a printed circuit board (PCB) of the computer to directly use the optical fiber-communication technique.

SUMMARY

Embodiments of the inventive concept may provide an optical device module capable of increasing or maximizing coupling efficiency and an optical communication network system using the same.

In one aspect, an optical device module may include: a substrate; an interlayer insulating silicon oxide ($SiO_2$) layer on the substrate; an optical waveguide core layer consisting of silicon nitride or silicon oxynitride ($Si_3N_4$, or $Si_xO_yN_z$, where x, y, z are arbitrary numbers) on the interlayer insulating layer; an optical device consisting of a vertical cavity surface emitting laser (VCSEL) or a photodiode on the optical waveguide; and a prism disposed between the optical device and the optical waveguide, the prism having a refractive index greater than a refractive index of the optical waveguide core.

In an embodiment, the prism may have a wedge-shape having an incline plane tilted with respect to an extending direction of the optical waveguide.

In an embodiment, the prism of the wedge-shape may include gallium phosphide or silicon.

In an embodiment, the prism of the wedge-shape may include the gallium phosphide; and the incline plane of the prism may have an inclination angle of about 35.2 degrees with respect to the extending direction of the optical waveguide.

In an embodiment, the prism of the wedge-shape may include the silicon; and the incline plane of the prism may have an inclination angle of about 29.5 degrees with respect to the extending direction of the optical waveguide.

In an embodiment, the optical device may be bonded to the incline plane; and the optical device may further include a laser diode, or an optical fiber.

In an embodiment, the optical device module may further include: a buffer layer disposed between the prism and the optical waveguide. The buffer layer may have a refractive index greater than the refractive index of the optical waveguide.

In an embodiment, the buffer layer may include index-matching oil or adhesive.

In an embodiment, the optical device module may further include: an upper insulating layer adjacent to the prism and covering a portion of the optical waveguide.

In an embodiment, the interlayer insulating layer and the upper insulating layer may include silicon oxide.

In an embodiment, the prism may have a hexahedral shape including flat surfaces parallel to the optical waveguide.

In an embodiment, the optical device module may include an upper buffer layer and an upper optical waveguide.

In an embodiment, the optical device module may further include a top upper insulating layer adjacent to the prism and covering a portion of the upper optical waveguide.

In an embodiment, the optical device module may further include: a semiconductor device disposed within the interlayer insulating layer.

In another aspect, an optical communication network system may include: a substrate including a sub-control region, a connection region, and a sub-unit cell region; sub-control parts disposed on the sub-control region, each of the sub-control parts including first light sources and first detectors; sub-unit cell parts including second detectors and second light sources disposed on the sub-unit cell region, the second detectors and the second light sources communicating with the first light sources and the first detectors; optical waveguides disposed on the sub-control region, the connection region, and the sub-unit cell region, the optical waveguides connecting the first light sources to the second detectors and connecting the first detectors to the second light sources; and a prism disposed between the optical waveguides and at least one of the first light source, the first detector, the second light source, and the second detector, the prism having a refractive index greater than a refractive index of the optical waveguides.

In an embodiment, the optical waveguides may include: a first optical waveguide connected between the first light source and the second detector; and a second optical waveguide connected between the first detector and the second light source. The first optical waveguide may not cross the second optical waveguide.

In an embodiment, each of the sub-control parts may be connected to N sub-unit cell parts through the optical waveguides to constitute a unit cell part, where 'N' denotes a natural number equal to or greater than 2; the number of the sub-control parts may be N such that N unit cell parts may be disposed on the network; and the N unit cell parts may include $N^2$ sub-unit cell parts.

In an embodiment, the optical communication network system may further include: main control parts of which each is connected to the $N^2$ sub-unit cell parts through the optical waveguides. In this case, the main control parts and the unit cell parts connected thereto may constitute N upper unit cell parts; and the N upper unit cell parts may include $N^3$ sub-unit cell parts.

In an embodiment, the optical waveguides may include silicon nitride or silicon oxynitride.

In an embodiment, the prism may include a crystal structure material having a refractive index greater than the refractive index of the optical waveguides; and the crystal structure material may include gallium phosphide or silicon.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
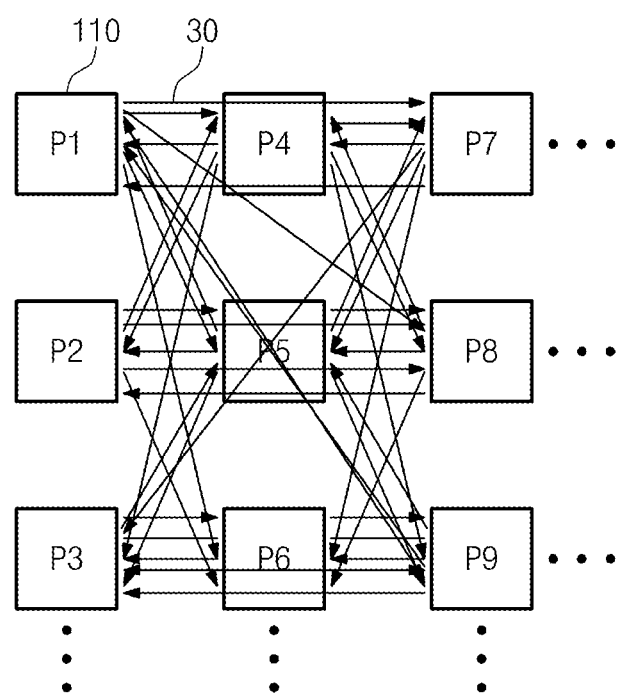
FIG. 1 is a plan view illustrating a general optical communication network system.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

FIG. 1 is a plan view illustrating a general optical communication network system.

Referring to FIG. 1, a general optical communication network system may include a plurality of sub-unit cell parts 110 and a plurality of optical waveguides 30. The sub-unit cell parts 110 may be arranged in matrix form. The optical waveguides 30 may be divided into pairs and may be connected between the sub-unit cell parts 110. A pair of the optical waveguides 30 may input and output an optical signal between the sub-unit cell parts 110. For example, N sub-unit cell parts 110 may be connected to each other through $2^N$ optical waveguides 30, where denotes a natural number equal to or greater than 2. In a two-dimensional plane, the optical waveguides 30 may necessarily have crossing points thereof. An optical switch (not shown) may be disposed at each of the crossing points. The optical switches may complex an optical communication network.

Thus, it may be difficult that the general optical communication network system is designed to have a two-dimensional plane structure.

Figure 2:
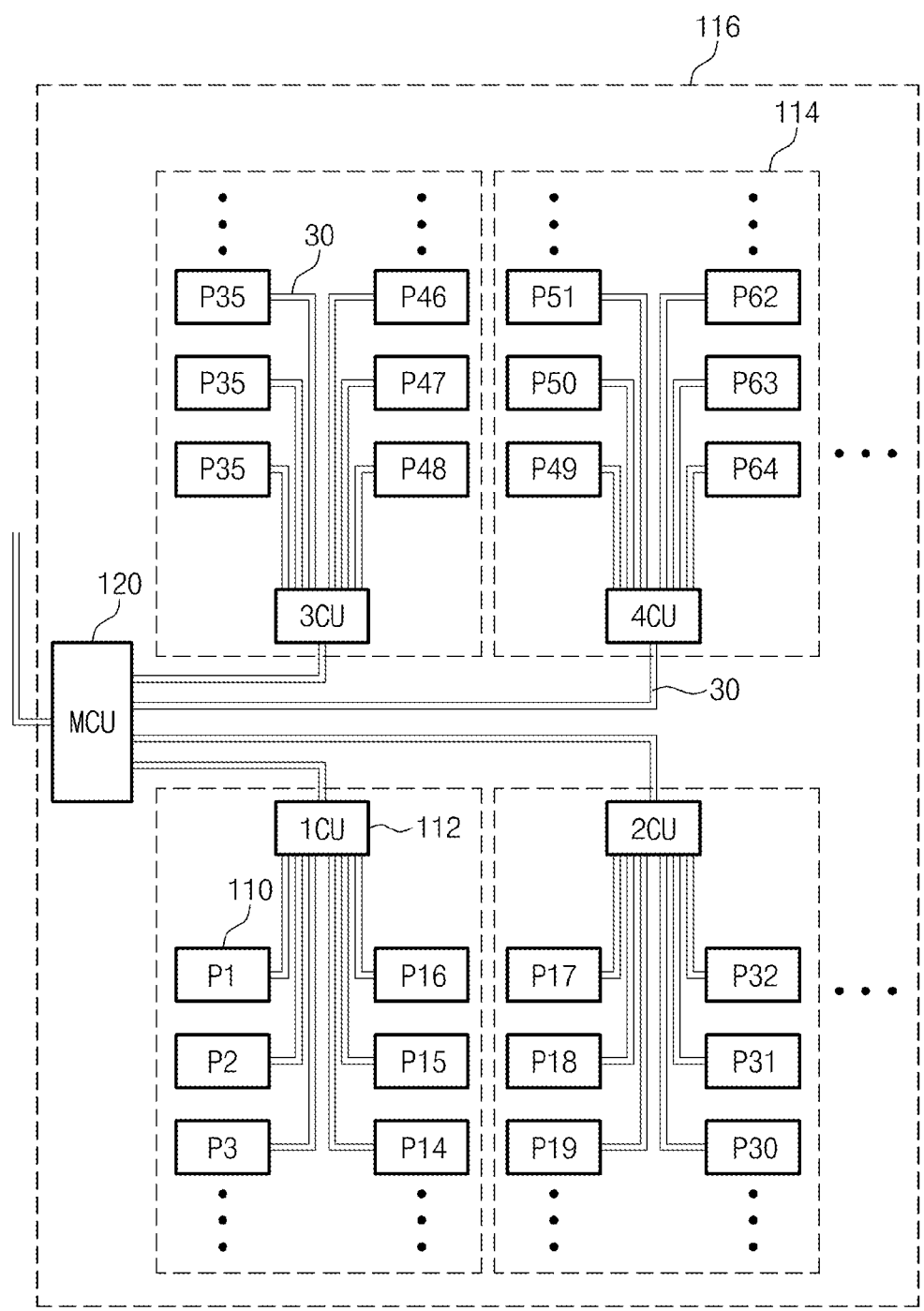
FIG. 2 is a plan view illustrating an optical communication network system according to example embodiments of the inventive concept.

FIG. 2 is a plan view illustrating an optical communication network system according to example embodiments of the inventive concept.

Referring to FIG. 2, an optical communication network system according to inventive concept may include main control parts 120, sub-control parts 112, sub-unit cell parts 110, and optical waveguides 30. The optical waveguides 30 may be connected to the main control parts 120, the sub-control parts 112, and the sub-unit cell parts 110 in the order named. The main control parts 120 may output control signals controlling the sub-control parts 112 and the sub-unit cell parts 110 and may receive response signals. The sub-control parts 112 may communicate with the main control parts 120 and may control the sub-unit cell parts 110. One sub-control part 112 and 16 sub-unit cell parts 110 connected thereto may constitute a unit cell part 114. The optical communication network system according to inventive concept may include a plurality of the unit cell parts 114. If the optical communication network system according to inventive concept includes 16 unit cell parts 114, the 16 unit cell parts 114 may include $16^2$ sub-unit cell parts 110. Additionally, one main control part 120 and the 16 unit cell parts 114 connected thereto may constitute an upper unit cell part 116. Even though not shown in the drawings, 16 upper unit cell parts 116 may include $16^3$ sub-unit cell parts 110. The upper unit cell parts 116 and a super main control part (not shown) may constitute a high dimensional unit cell part. Thus, the optical communication network system according to inventive concept may include M-dimensional unit cell parts 114 and $16^M$ sub-unit cell parts 110, where 'M' denotes a natural number.

The sub-control part 112 may output the optical signal of a selected sub-unit cell part 110 to another sub-unit cell part 110 in the same unit cell part 114, another unit cell part 114, or another upper unit cell part 116. Each of the main control parts 120, the sub-control parts 112 and the sub-unit cell parts 110 may perform a photoelectric converting operation between the optical signal and an electrical signal.

Figure 3:
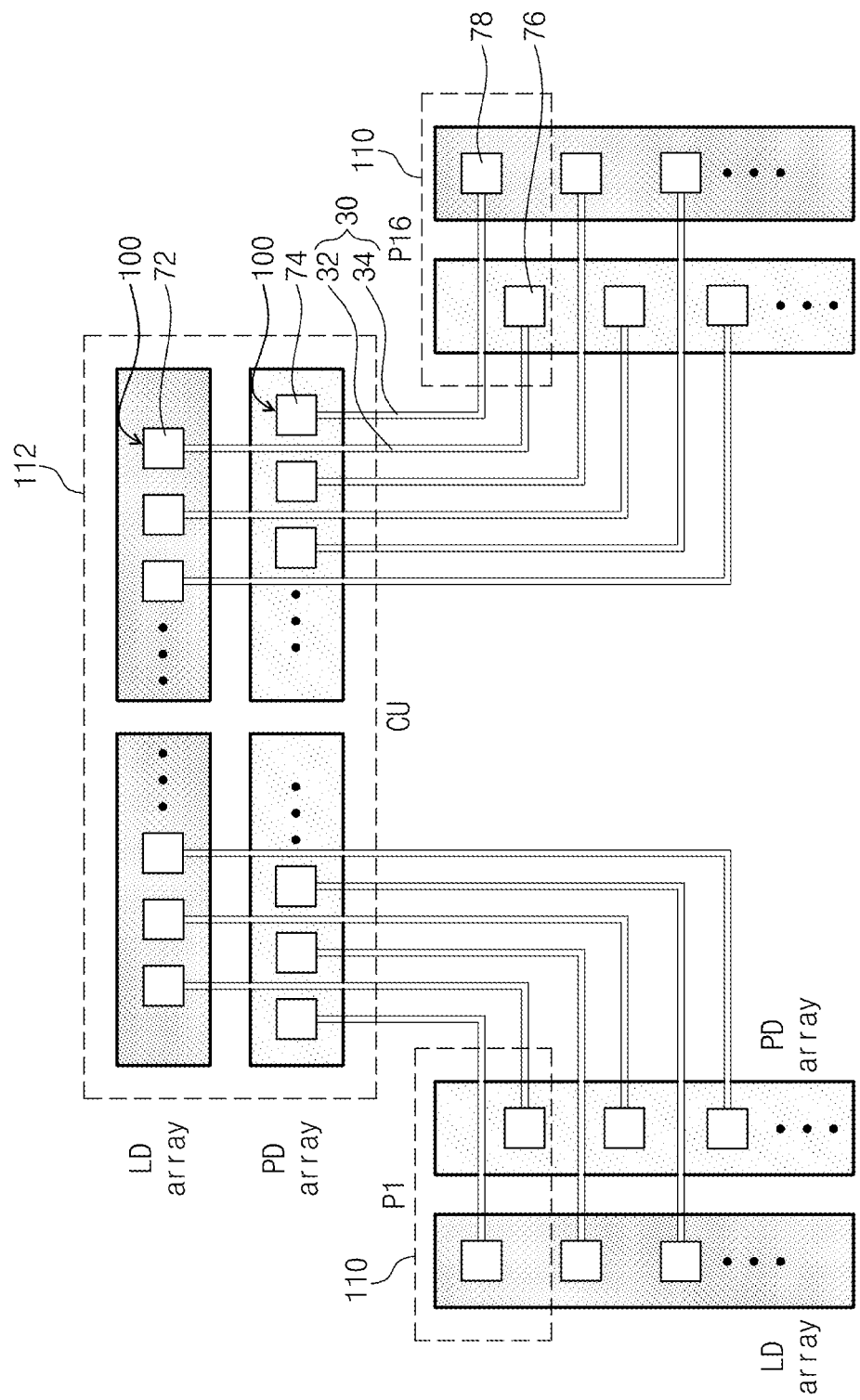
FIG. 3 is a plan view illustrating a sub-control part and sub-unit cell parts of FIG. 2 in more detail.

FIG. 3 is a plan view illustrating the sub-control part 112 and the sub-unit cell parts 110 of FIG. 2 in more detail.

Referring to FIGS. 2 and 3, the sub-control part 112 may include first light sources 72 and first detectors 74. Each of the sub-unit cell parts 110 may include a second detector 76 and a second light source 78. Each of the first and second light sources 72 and 78 may include a vertical cavity surface emitting laser (VCSEL) or a laser diode. Each of the first and second detectors 74 and 76 may include a photo diode. The first light source 72 and the second detector 76 may be connected to each other by a first optical waveguide 32. The first light source 72, the first optical waveguide 32, and the second detector 76 may constitute a first communication line. A second optical waveguide 34 may connect the first detector 74 to the second light source 78. Likewise, the first detector 74, the second optical waveguide 34, and the second light source 78 may constitute a second communication line. The first optical waveguide 32 and the second optical waveguide 34 do not cross each other and may connect the sub-control part 112 to the sub-unit cell part 110.

The first light source 72, the first detector 74, the second light source 78, and a second detector 76 are optical devices. The optical devices may be combined with the optical waveguides to constitute an optical device module 100. The optical waveguides 30 may connect the optical device modules 100 to each other. The sub-unit cell parts 110 may have a plurality of optical device modules 100 transmitting and receiving optical signals.

Hereinafter the optical device module 100 capable of maximizing optical coupling efficiency will be described in detail with reference to embodiments.

Figure 4:
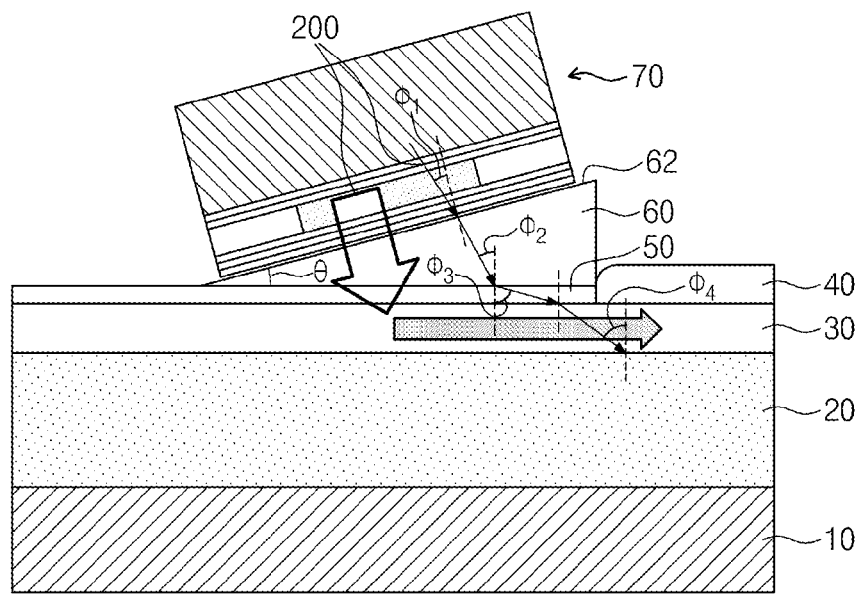
FIG. 4 is a cross-sectional view illustrating an optical device module according to a first embodiment of the inventive concept.

FIG. 4 is a cross-sectional view illustrating an optical device module 100 according to a first embodiment of the inventive concept.

Referring to FIGS. 2 to 4, an optical device module 100 according to a first embodiment of the inventive concept may include a substrate 10, an interlayer insulating layer 20, an optical waveguide 30, an upper insulating layer 40, a buffer layer 50, a prism 60, and an optical device 70.

The substrate 10 may include crystalline silicon. The crystalline silicon may have a refractive index of about 3.45. The optical device module 100 is a small part of component by which the optical network Even though not shown in the drawings, the optical communication network is comprised of a plurality of optical device module 100, where the network may have a sub-control region, a connection region, and a sub-unit cell region. The sub-control region may correspond to the sub-control parts 112. The sub-unit cell region may correspond to the sub-unit cell parts 110. The connection region is disposed between the sub-control region and the sub-unit cell region. The interlayer insulating layer 20 may be disposed on the substrate 10. The interlayer insulating layer 20 may include silicon oxide. The silicon oxide may have a refractive index of about 1.45.

The optical waveguide 30 may extend in one direction on the interlayer insulating layer 20. The interlayer insulating layer 20 may have a refractive index lower than that of the optical waveguide 30. The optical waveguide 30 may have a refractive index lower than that of the substrate 10. The optical waveguide 30 may include silicon nitride or silicon oxynitride. The silicon nitride may have a refractive index of about 2.0. The silicon oxynitride may have a refractive index of about 1.7.

The upper insulating layer 40 may cover a portion of the optical waveguide 30. A refractive index of the upper insulating layer 40 may be lower than the refractive index of the optical waveguide 30. The upper insulating layer 40 may include silicon oxide.

The buffer layer 50 may be adjacent to the upper insulating layer 40 and may cover another portion of the optical waveguide 30. The buffer layer 50 may have a refractive index higher than that of the optical waveguide 30. The buffer layer 50 may include index-matching oil or adhesive having a refractive index of about 1.7 to about 2.1.

The prism 60 may be disposed on the buffer layer 50. The buffer layer 50 may prevent air from flowing between the prism 60 and the optical waveguide 30. This is because the air interrupts optical transmission between the prism 60 and the optical waveguide 30. The prism 60 may have a refractive index higher than that of the buffer layer 50. The prism 60 may have a wedge-shape having an incline plane 62. An inclination angle θ of the prism 60 may correspond to a refracting angle. The prism 60 may include crystalline silicon or gallium phosphide (GaP). Crystalline gallium phosphide may have a refractive index of about 3.05.

The optical device 70 may be vertically bonded to the incline plane 62 of the prism 60. The optical device 70 may include the first light source 72, the first detector 74, the second detector 76, or the second light source 78.

The first light source 72 or the second light source 78 may provide a laser beam 200 to the optical waveguide 30. As described above, each of the first and second light sources 72 and 78 may include a vertical cavity surface emitting laser (VCSEL) or a laser diode. Refracting angles of the laser beam 200 may increase in order when the laser beam 200 travels from the prism 60 into the optical waveguide 30. The refracting angle of the laser beam 200 may increase whenever the laser beam 200 travels from a medium of a high refractive index into a medium of a low refractive index. If the refractive index of the laser beam 200 is 90 degrees in the optical waveguide 30, the optical device 70 (e.g., the first light source 72 or the second light source 78) and the optical waveguide 30 of the optical device module 100 may have the maximum coupling efficiency.

The laser beam 200 may be perpendicularly incident into the incline plane 62 of the prism 60. In this case, a first incidence angle $\Phi_1$ of the laser beam 200 is 0 (zero). Additionally, a first refracting angle (not shown) of the laser beam 200 is 0 (zero) at the incline plane 62. If an optical signal is incident from a medium having a low refractive index into a medium having a high refractive index, a refracting angle of the optical signal is smaller than an incidence angle of the optical signal. The laser beam 200 may be incident from air into the prism 60.

Thereafter, the laser beam 200 may be incident on a bottom surface of the prism 60 with a second incidence angle $\Phi_2$. The second incidence angle $\Phi_2$ is equal to the inclination angle θ of the incline plane 62 of the prism 60. The laser beam 200 may be refracted in the buffer layer 50 with a second refracting angle $\Phi_3$. The second refracting angle $\Phi_3$ may be greater than the second incidence angle $\Phi_2$. If an optical signal is incident from a medium having a high refractive index into a medium having a low refractive index, a refracting angle of the optical signal is greater than an incidence angle of the optical signal. The laser beam 200 may travel in the optical waveguide 30 with a third refracting angle $\Phi_4$. The third refracting angle $\Phi_4$ may be greater than the second refracting angle $\Phi_3$.

When the laser beam 200 has the third refracting angle $\Phi_4$ of about 90 degrees, the optical device module 100 may have the maximum coupling efficiency. At this time, the laser beam 30 may travel through the optical waveguide 30 in parallel to the optical waveguide 30. If the third refracting angle $\Phi_4$ is greater or less than 90 degrees, the laser beam 200 may be reflected by a bottom surface of the optical waveguide and then may return toward the optical device 70. Thus, a coupling efficiency of the optical device module may be reduced.

For example, the prism 60 of crystalline silicon may have an inclination angle of about 25 degrees to about 35 degrees. In particular, when the incline plane 62 of the prism 60 of crystalline silicon has the inclination angle of about 29.6 degrees, the optical device module 100 according to the first embodiment may have the maximum coupling efficiency. The prism 60 of gallium phosphide may have an inclination angle of about 30 degrees to about 40 degrees. The following table 1 presents an experimentally measured output power of the laser beam according to the inclination angle of the gallium phosphide prism 60,

TABLE 1

| Inclination angle of GaP prism (degree) | Output power (mW) with input power 9.69 mW |
|---|---|
| 35.06 | 0.801 |
| 35.2 | 0.81 |
| 35.35 | 0.804 |
| 35.5 | 0.706 |

Referring to table 1, when the incline plane of the gallium phosphide prism 60 has the inclination angle of about 35.2 degrees, the laser beam was measured to have the maximum output power of about 0.81 mW. Thus, the optical device module 100 according to the first embodiment may have the maximum coupling efficiency.

Additionally, the first detector 74 or the second detector 76 may detect the laser beam 200 transmitted from the optical waveguide 30. Refracting angles of the laser beam 200 may be reduced in order when the laser beam 200 travels from the optical waveguide 30 to the prism 60. The refracting angle of the laser beam 200 may be reduced whenever the laser beam 200 travels from a medium of a low refractive index into a medium of a high refractive index. If the refractive angle of the laser beam 200 is 0 degree from the prism 60 to the optical device 70 (e.g., the first detector 74 or the second detector 76), then the optical waveguide 30 may have the maximum coupling efficiency. Detail descriptions to the traveling of the laser beam 200 may be omitted.

Figure 5:
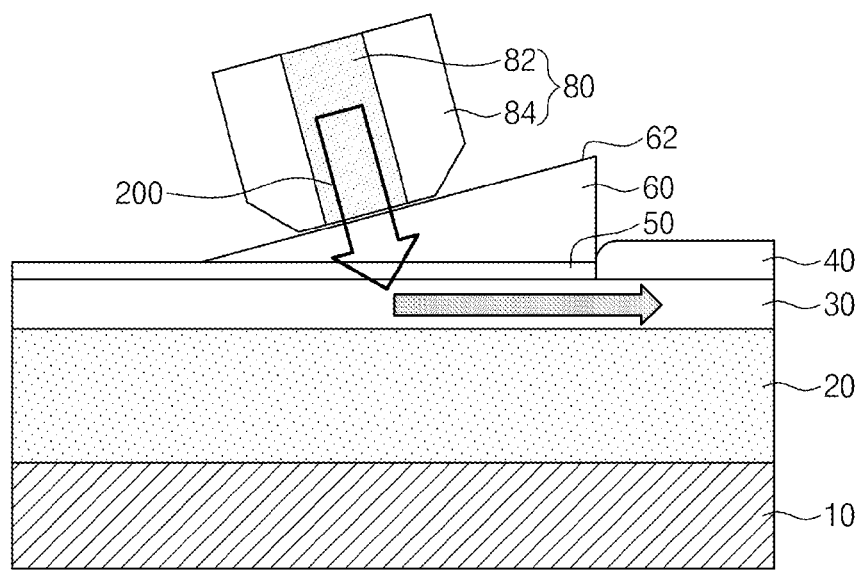
FIG. 5 is a cross-sectional view illustrating an optical device module according to an application example of the inventive concept.

FIG. 5 is a cross-sectional view illustrating an optical device module according to an application example of the inventive concept.

Referring to FIGS. 4 and 5, an optical device module 100 according to an application example of the inventive concept may include an optical fiber 80 bonded to the incline plane 62 of the prism 60. The optical fiber 80 may include a core 82 and a cladding 84. The cladding 84 may have a refractive index less than that of the core 82. A laser beam 200 may travel along the core 82. The core 82 and the cladding 84 may be perpendicularly coupled to the incline surface 62. The optical device module 100 according to the application example includes the optical fiber 80 instead of the optical device 70 of the first embodiment.

Figure 6:
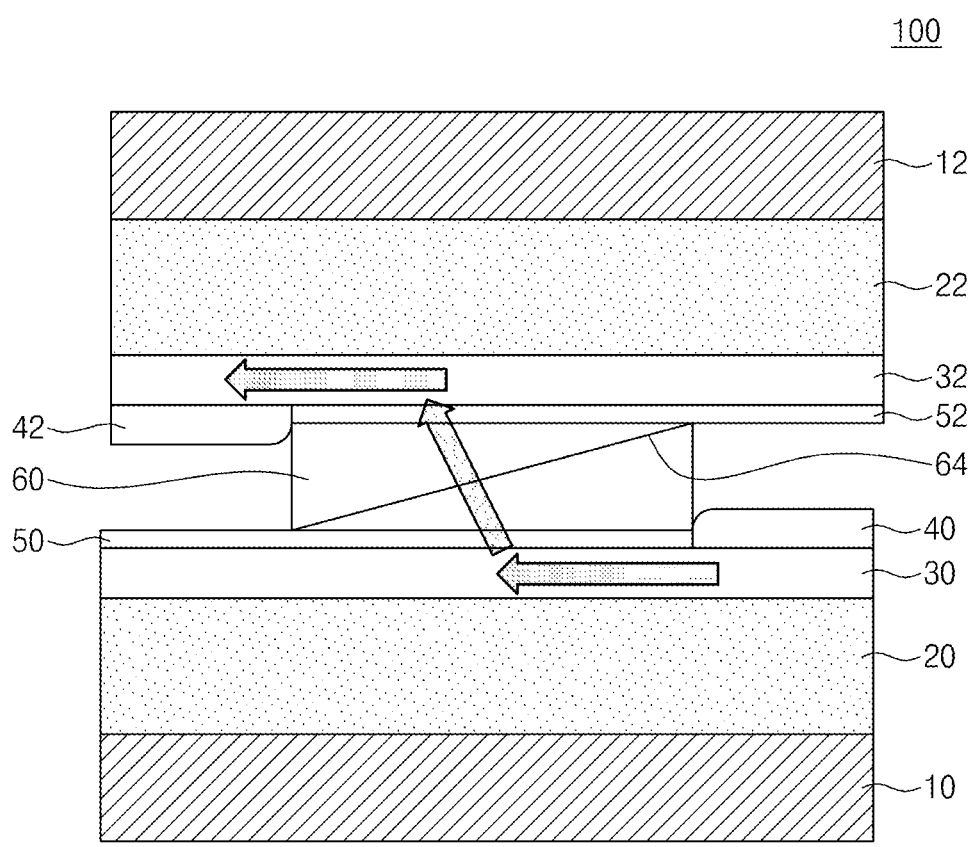
FIG. 6 is a cross-sectional view illustrating an optical device module according to a second embodiment of the inventive concept.

FIG. 6 is a cross-sectional view illustrating an optical device module according to a second embodiment of the inventive concept.

Referring to FIG. 6, an optical device module 100 according to a second embodiment of the inventive concept may include a substrate 10, an interlayer insulating layer 20, an optical waveguide 30, a cap layer 40, a buffer layer 50, a prism 60, an upper buffer layer 52, an upper cap layer 42, an upper optical waveguide 32, an upper interlayer insulating layer 22, and an upper substrate 12.

The upper substrate 12 and the substrate 10 may be symmetrical with respect to the prism 60. Likewise, the upper interlayer insulating layer 22 and the interlayer insulating layer 20 may be symmetrical with respect to the prism 60, and the upper optical waveguide 32 and the optical waveguide 30 may be symmetrical with respect to the prism 60. The upper cap layer 42 and the cap layer 40 may be symmetrical with respect to the prism 60, and the upper buffer layer 52 and the buffer layer 50 may be symmetrical with respect to the prism 60.

The upper substrate 12 may include the same crystalline silicon as the substrate 10. The upper interlayer insulating layer 22 and the upper cap layer 42 may include silicon oxide. The upper optical waveguide 32 may include silicon nitride or silicon oxynitride. The upper buffer layer 52 may include index-matching oil or adhesive.

The prism 60 may have a hexahedral shape having a bottom surface and a top surface which are parallel to the optical waveguide 30 and the upper optical waveguide 32. In FIG. 6, the prism 60 of the hexahedral shape is illustrated to have a quadrilateral cross section. The quadrilateral cross section of the prism 60 may have a hypothetical diagonal line 64. In other words, the prism 60 of the hexahedral shape may have a hypothetical diagonal plane corresponding to the diagonal line 64. The diagonal line 64 (or the diagonal plane) may correspond to the incline plane 62 described in the first embodiment. In the real fabrication, the prism 60 is one piece of hexahedral without attaching two wedge-shape prisms.

The optical device module 100 according to the second embodiment includes the prism 60 having the hexahedral shape instead of the prism 60 having the wedge-shape of the first embodiment. Additionally, the optical device module 100 according to the second embodiment includes the upper buffer layer 52 and the upper optical waveguide 32 instead of the optical device 70 of the first embodiment.

A laser beam 200 may be refracted and travel from the optical waveguide 30 to the upper optical waveguide 32. Refractive indexes of the elements from the optical waveguide 30 to the prism 60 may increase in order and then refractive indexes of the elements from the prism 60 to the upper optical waveguide 30 may be reduced in order along the traveling direction of the laser beam 200. The hexahedral prism 60 may have a predetermined width and a predetermined height for improving the coupling efficiency. If the width and height of the prism 60 are not suitable, the laser beam 200 may be reflected between the optical waveguide 30 and the upper optical waveguide 32 to be lost.

Figure 7:
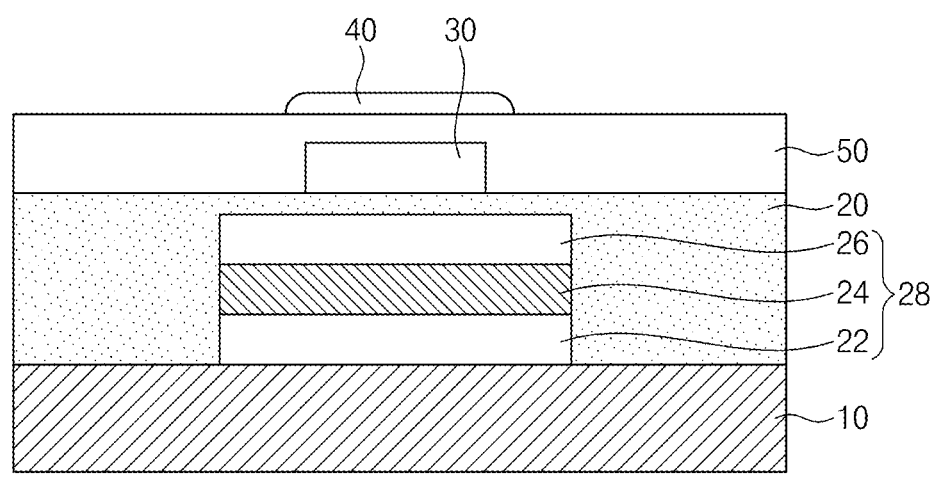
FIG. 7 is a cross-sectional view illustrating some elements of each of optical device modules according to embodiments of the inventive concept.

FIG. 7 is a cross-sectional view illustrating some elements of each of optical device modules according to embodiments of the inventive concept.

Referring to FIG. 7, the optical device module may include semiconductor devices 28 disposed within the interlayer insulating layer 20. The semiconductor device 28 may include a memory device such as a dynamic random access memory (DRAM) device or a NAND flash memory device. The semiconductor device 28 may include a word line 22, a bit line 24, and a metal line 26. The word line 22 may be a gate of a thin film transistor (not shown) disposed on the substrate 10. A source (not shown) and a drain (not shown) of the thin film transistor may be disposed in the substrate 10. The bit line 24 may be disposed on the word line 22. The word line 22 and the bit line 24 may be insulated from each other. The bit line 24 may be electrically connected to the source or the drain through a contact plug (not shown) and/or a contact pad (not shown). The metal line 26 may be disposed on the bit line 24. The bit line 24 and the metal line 26 may be insulated from each other. The metal line 26 may be a circuit line. The metal line 26 may be formed by, for example, a back-end process.

As described above, the optical device module according to the above embodiments may include the substrate, the interlayer insulating layer, the optical waveguide, the buffer layer, the prism, and the optical device. The optical waveguide may extend in one direction on the interlayer insulating layer and may include silicon nitride or silicon oxynitride. The buffer layer may cover the optical waveguide. The buffer layer may have the greater refractive index than the optical waveguide. The prism may be disposed on the buffer layer. The prism may have the greater refractive index than the buffer layer. The prism may have the wedge-shape having the incline plane. The incline plane may correspond to the inclination angle. The optical device may include the light source providing the laser beam. The optical device may be bonded to the incline plane of the prism, such that the laser beam may be perpendicularly incident on the incline plane. The refracting angles of the laser beam may progressively increase from the prism to the optical waveguide. If the refracting angle of the laser beam in the optical waveguide is 90 degrees, the optical waveguide and the optical device may have the maximum coupling efficiency.

The maximum coupling efficiency may be determined depending on the refractive index of the optical waveguide, the refractive index of the buffer layer, the refractive index of the prism, and the inclination angle of the prism.

As a result, the optical device module and the optical communication network system using the same according to the inventive concept may increase or maximize the coupling efficiency.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. An optical communication network system comprising:
   a substrate including a sub-control region, a connection region, and a sub-unit cell region;
   main control parts;
   sub-control parts disposed on the sub-control region, each of the sub-control parts including a first light source and a first detector;
   a first plurality of optical waveguides connecting the sub-control parts and one of the main control parts without crossing each other;
   sub-unit cell parts disposed on the sub-unit cell region, each of the sub-unit cell parts including a second detector and a second light source, the second detector and the second light source communicating with the first light source and the first detector;
   a second plurality of optical waveguides disposed on the sub-control region, the connection region, and the sub-unit cell region, the second plurality of optical waveguides connecting the sub-unit cell parts and one of the sub-control parts without crossing each other; and
   a prism disposed between one of the second plurality of optical waveguides and any one of the first light source, the first detector, the second light source, and the second detector, the prism having a refractive index greater than a refractive index of the optical waveguides.

2. The optical communication network system of claim 1, wherein the second plurality of optical waveguides comprises:
   a third optical waveguide connected between the first light source and the second detector; and
   a fourth optical waveguide connected between the first detector and the second light source.

3. The optical communication network system of claim 1, wherein each of the sub-control parts is connected to N sub-unit cell parts through a third plurality of optical waveguides to constitute a unit cell part, where N denotes a natural number equal to or greater than 2;
   wherein a number of the sub-control parts is N such that the network system includes N unit cell parts; and
   wherein the N unit cell parts include $N^2$ sub-unit cell parts.

4. The optical communication network system of claim 3, wherein the main control parts, each of which is connected to the $N^2$ sub-unit cell parts through a fourth plurality of optical waveguides, wherein the main control parts and the unit cell parts connected thereto constitute N upper unit cell parts; and
wherein the N upper unit cell parts include $N^3$ sub-unit cell parts.

5. The optical communication network system of claim 1, wherein the second pluralities of optical waveguides include silicon nitride or silicon oxynitride.

6. The optical communication network system of claim 1, wherein the prism includes a crystal structure material having a refractive index greater than the refractive index of the second pluralities of optical waveguides; and
wherein the crystal structure material includes gallium phosphide or silicon.

7. The optical communication network system of claim 1, wherein the connection region is disposed between the sub-control region and the sub-unit cell region.

8. The optical communication network system of claim 1, wherein the second pluralities of optical waveguides include a third optical waveguide, the system further comprising a buffer layer disposed between the prism and the third optical waveguide, and
wherein the prism transmits an incident beam to the buffer layer, the refractive index of the prism being greater than a refractive index of the buffer layer.

9. The optical communication network system of claim 8, wherein the refractive index of the buffer layer is greater than the refractive index of the third optical waveguide.

10. The optical communication network system of claim 8, wherein the prism has a wedge-shape having an incline plane with respect to an extending direction of the third optical waveguide.

11. The optical communication network system of claim 10, wherein the incline plane of the prism has an inclination angle in a range from 25 degrees to 35 degrees with respect to the extending direction of the third optical waveguide.

12. The optical communication network system of claim 1, wherein the first plurality of optical waveguides connect the sub-control parts and the one of the main control parts without crossing each other when seen in a plan view, and
wherein the second plurality of optical waveguides connect the sub-unit cell parts and the one of the sub-control parts without crossing each other when seen in the plan view.

13. The optical communication network system of claim 1, wherein the second plurality of optical waveguides are dielectric waveguides.

14. An optical communication network system comprising:
a substrate including a sub-control region, a connection region, and a sub-unit cell region;
sub-control parts disposed on the sub-control region, each of the sub-control parts including a first light source and a first detector;
sub-unit cell parts disposed on the sub-unit cell region, each of the sub-unit cell parts including a second detector and a second light source, the second detector and the second light source communicating with the first light source and the first detector;
optical waveguides disposed on the sub-control region, the connection region, and the sub-unit cell region, the optical waveguides connecting the first light source to the second detector and connecting the first detector to the second light source, the optical waveguides including a first optical waveguide;
a prism disposed between one of the optical waveguides and any one of the first light source, the first detector, the second light source, and the second detector, the prism having a refractive index greater than a refractive index of the optical waveguides; and
a buffer layer disposed between the prism and the first optical waveguide,
wherein the prism transmits an incident beam to the buffer layer, the refractive index of the prism being greater than a refractive index of the buffer layer.

15. The optical communication network system of claim 14, wherein the refractive index of the buffer layer is greater than the refractive index of the optical waveguides.

16. The optical communication network system of claim 14, wherein the prism has a wedge-shape having an incline plane with respect to an extending direction of the first optical waveguide.

17. The optical communication network system of claim 16, wherein the incline plane of the prism has an inclination angle in a range from 25 degrees to 35 degrees with respect to the extending direction of the first optical waveguide.

* * * * *